United States Patent Office 3,647,617
Patented Mar. 7, 1972

3,647,617
THIN METAL LAMINATES
James K. Rieke, Douglas Raymond Behr, and Otis R. McIntire, Midland, Mich., assignors to The Dow Chemical Company, Midland, Mich.
No Drawing. Continuation-in-part of application Ser. No. 586,372, Oct. 13, 1966. This application May 4, 1970, Ser. No. 34,616
Int. Cl. B32b 15/08; C09j 3/14
U.S. Cl. 161—216                                       9 Claims

ABSTRACT OF THE DISCLOSURE

A thin metal laminate useful, for example, as household foil comprising two thin metal layers such as aluminum bonded together with an adhesive polymer layer such as a copolymer of ethylene and acrylic acid is produced by forming a composite of the two metal layers with the adhesive polymer layer disposed between the metal layers, subjecting the composite to heat and pressure to form a bond between the metal layers and the adhesive polymer layer and thereby produce a laminate, and rolling the laminate at a temperature of not more than about 75° C. to reduce the thickness of the laminate at least about 5 percent.

---

This application is a continuation-in-part of application Ser. No. 586,372 filed Oct. 13, 1966 and now abandoned.

This invention relates to laminates of thin metal layers bonded together with a layer of an adhesive thermoplastic polymer material. In another aspect, this invention relates to a method for producing a laminate having at least two thin metal layers adhered together with an interlayer of a polymer having as essential components a major proportion of ethylene and a minor proportion of at least one ethylenically unsaturated carboxylic acid. In yet another aspect, this invention relates to articles fabricated from laminates of thin metal layers bonded together with an adhesive polymer material.

Metal-polymer-metal laminates are well known in the art and have been used in applications such as building panels, insulation panels, medical splints, and the like. Such laminates are by necessity quite thick and heavy in order to provide sufficient strength and rigidity for the intended use. While there is a demand for so-called thin metal laminates in, for example, the electrical industry for fabricating electrical components such as capacitors and the like and in the packaging industry for use by manufacturers and for use in the home, the art of lamination does not include a feasible method for producing thin metal laminates because the problems peculiar to their production have not been solved.

It has now been found that very thin laminates, e.g., less than 3 mils total thickness, can be successfully prepared for a variety of uses including use as a new household foil. Currently available household foils are a single layer of aluminum foil having a total thickness of between about 0.7 and about 1 mil. It is known that such foils have many pin-holes and very low tear strength. Such undesirable properties limit their utility because, for example, in most situations once the foil has been used it cannot be used again for another purpose. Therefore, it is evident that it would be highly desirable to provide a foil of a type which would overcome the above-described disadvantages.

In accordance with the present invention, thin metal laminates are produced by a method which comprises forming a composite of at least two thin metal layers and a layer of a polymer disposed between said metal layers, said polymer having as essential components a major proportion of ethylene and a minor proportion of at least one ethylenically unsaturated carboxylic acid; producing a laminate of said composite by subjecting said composite to heat and pressure to form a bond between said metal layers and said layer of polymer; and rolling said laminate at a temperature of not more than about 75° C. to reduce the thickness of said laminate at least about 5 percent. The laminate be rolled at substantially normal room temperature if desired.

The adhesive polymers that are suitable for use in the practice of the present invention are preferably copolymers of a major proportion of ethylene and a minor proportion of acidic comonomer selected from α,β-ethylenically unsaturated mono- and polycarboxylic acids and acid anhydrides having from 3 to 7 carbon atoms per molecule and partial esters of such polycarboxylic acids wherein the acid moiety has at least one carboxyl group and the alcohol moiety has from 1 to 20 carbon atoms. Specific examples of such acidic comonomers include acrylic acid, methacrylic acid, crotonic acid, fumaric acid, maleic acid, itaconic acid, maleic anhydride, monomethyl maleate, monoethyl maleate, monomethyl fumarate and monoethyl fumarate.

The copolymers as described above may also contain a minor proportion of a third component such as an ester of the ethylenically unsaturated carboxylic acids as described above or an aliphatic ester of a carboxylic acid, said ester having ethylenic unsaturation, e.g. vinyl acetate, vinyl propionate, vinyl butyrate, and the like. It is also within the spirit and scope of the invention to employ an adhesive copolymer of the type described above wherein some of the acid groups are ionized by neutralization with a salt forming cation such as a mono-, di-, or trivalent metal ion or the like.

The above-described comonomers may be combined to form random, block or sequential, or graft type polymers, and mixtures of polymers may be used. In general, polymers having a Melt Index of between about 0.1 and about 30 as determined by ASTM Test Procedure 1238 (Condition E) can be used in the practice of the invention. Such polymers can be made by polymerizing an ethylenically unsaturated carboxylic acid with ethylene or an ethylenically unsaturated carboxylic acid and a polymerizable unsaturated aliphatic ester of a carboxylic acid with ethylene at elevated temperatures and pressures in the presence of a suitable catalyst. Excellent adhesive properties are provided with polymers which contain between about 75 and about 99.5 weight percent combined ethylene and between about 0.5 and about 25 weight percent combined ethylenically unsaturated carboxylic acid. It is generally preferred that the adhesive copolymer contain between about 6 percent and about 10 percent by weight ethylenically unsaturated carboxylic acid based on the weight of the copolymer. The thickness of the polymer layer to be employed in the present invention should be from about 0.5 mil to about 4 mils and preferably from about 0.8 mil to about 2 mils.

Suitable metals to be employed are preferably maleable metals which can be rolled under pressure to form the thin laminate construction of the invention. Examples include aluminum, copper, tin, alloys of such metals, and the like; however, aluminum is preferred. The metal thickness should be from about 0.2 mil to about 2 mils and preferably from about 0.3 mil to about 1.5 mils. The metals used in preparing the laminates of this invention can have a hardness within a rather broad range. The actual hardness of a particular metal will depend upon such factors as the intended utility of the final product, the percent reduction which is effected during rolling, the type and thickness of the adhesive polymer layer, the thickness of the metal layers, and the like. As a general proposition, metals having intermediate hardness or so-called "half-hard" metals result in the largest percent reduction in thickness during rolling of the laminate in accordance with the method of the invention. While hardness can be used as a factor which governs the selection of a particular metal, for convenience in at least some situations it is more desirable to select the metal or metal alloy on the basis of its tensile yield strength. For example, aluminum having a tensile yield strength of between about 6000 and about 16,000 p.s.i. as determined by ASTM Test Procedure E8-65T possesses the requisite properties necessary for use in the practice of the invention. Similarly, copper having a tensile yield strength between about 12,000 and about 40,000 p.s.i. and tin having a tensile yield strength of between about 1500 and about 5,000 p.s.i., as determined by ASTM E8-65T, can also be employed as the metal layers.

Laminates of the present invention are produced by placing a thin layer of a copolymer of ethylene and an ethylenically unsaturated carboxylic acid, e.g., ethylene and acrylic acid, between two thin layers of metal, e.g., aluminum, subjecting the assembly to heat of from about 120° C. to about 250° C. and preferably from about 140° C. to about 210° C. and pressures sufficient to cause the polymer to wet the metal surface to form the laminate, cooling the resulting laminate and placing said laminate between driven rolls, said rolls exerting sufficient pressure to reduce the total thickness of the laminate at least about 5 percent and preferably between about 10 and about 50 percent. In a preferred embodiment of the invention, thin metal laminates are produced continuously by passing at least two thin metal layers through the nip of a first pair of oppositely rotating rolls; extruding a layer of a polymer between at least two of said thin metal layers (i.e., between each pair of two adjacent metal layers), said polymer having as essential components a major proportion of ethylene and a minor proportion of at least one ethylenically unsaturated carboxylic acid; applying pressure to said thin metal layers and said layer of polymer by means of said rolls to form a laminate comprising at least two of said thin metal layers and said layer of polymer; and passing said laminate through the nip of a second pair of oppositely rotating rolls to roll said laminate at a temperature of not more than about 75° C. and thereby reduce the thickness of said laminate at least about 5 percent. In this embodiment, the second pair of rolls can also be adjusted to reduce the thickness of the laminate between about 10 and about 50 percent. The thin metal laminate after rolling preferably has a total thickness of not more than about 3 mils.

It has been observed that the metal and thermoplastic interlayer appear to "flow" together during the rolling operation to reduce the thickness of the laminate thereby producing a thin laminate construction having a smooth finish. The rolling operation reduces the thickness of both metal layers and the adhesive polymer layer in substantially equal proportion such that there is substantially no polymer extruded from between the metal layers. The plastic interlayer seals any small pin holes in the thin foil and also provides a bonded metal-polymer-metal laminate construction which is more resistant to tearing than currently available single layer metal foils. The laminate article produced by the method of the present invention employs less total aluminum than the commercially available single-layer aluminum foils and is, therefore, more economical to produce and provides the additional advantage of being free of pin-holes. The laminate can also have improved strength properties.

The method of the present invention provides a way of producing very thin metal-plastic-metal laminates which cannot be practically or economically produced by conventional laminating techniques. For example, it would be extremely difficult to produce the laminates of the present invention by placing a very thin layer, e.g., about 0.5 mil, of the specified copolymer between two very thin layers of metal, e.g., about 0.2 mil, and subjecting the assembly to heat and pressure. Although such thin metal materials are commercially available, they are very expensive. More important is the fact that such metals are very fragile and extremely difficult to handle. Therefore, the method of the invention eliminates the necessity of purchasing and handling expensive, fragile metals which would otherwise be necessary to produce the thin laminate articles.

The laminates of Examples 1 through 5 were prepared and tested in accordance with the following procedures:

PREPARATION OF LAMINATES

A copolymer of ethylene and acrylic acid (8 percent by weight) was continuously extruded through a 4½ inch extruder having a center-fed slot die at an exit temperature of about 232° C. to produce a continuous layer of the copolymer 1 mil thick. The copolymer layer was continuously passed between two continuously moving layers of aluminum 25 inches wide and 0.35 mil thick. The assembly was passed between rolls which exerted sufficient pressure on the assembly to form the resulting laminated product. The laminate was cooled and wound up for storage.

ROLLING OF LAMINATES

The laminate as described above was cold rolled in a rolling mill at substantially normal room temperature to reduce the total thickness. The laminate was flooded with a conventional rolling lubricant as it entered the nip of the rolls and rolled at a speed of from about 100 to about 400 feet per minute. Rolling speeds of between about 50 and about 600 feet per minute can be employed if desired. The rolling speed and the viscosity of the rolling lubricant were varied in order to obtain the desired reduction in thickness of laminate. The percent reduction in thickness was calculated by dividing the value of the original thickness into the value for the difference between the original thickness and the rolled thickness and multiplying by 100.

TESTING OF LAMINATES

Tensile tests were run on the rolled laminate as prepared above, in accordance with ASTM E8-65T and ASTM B 373-65, Section 14(d) except that a speed of 0.1 inch/min. was employed after attaining the yield strength. The tensile strength of the laminates was based on the cross-sectional area of the aluminum foil only and not on the total cross-sectional area of the laminate.

Tear tests were conducted on pieces of the laminates measuring 1 inch wide and 4 inches long cut from the laminates as prepared above. A tongue ½-inch wide and 2 inches long was cut midway between the edges at one end of the laminate, leaving a strip ¼-inch wide on each side of the tongue. The two ¼-inch strips were anchored to a piece of paper leaving the tongue free. The paper was inserted into one grip of a tensile testing machine and the tongue of the laminate was placed into the other grip of the machine. The grips were moved apart at a speed of 5 inches/min. and the load recorded on a chart recorder.

The following examples are illustrative of the invention and are not intended to limit the scope thereof.

EXAMPLES 1-5

The laminates of the following examples were prepared and tested in accordance with the procedures as described above with the results being set forth in Table I. Tests $C_1$ and $C_2$ are not examples of the invention but are included for comparative purposes only. In $C_1$ and $C_2$, ordinary household aluminum foil was subjected to the same tests as the laminates of the invention. The results are shown in Table I:

TABLE I.—PROPERTIES OF ROLLED LAMINATES

| Product | Example | Percent reduction | Thickness after rolling (mils) | Tensile strength (p.s.i.) Yield [1] | Tensile strength (p.s.i.) Ultimate | Extension at fracture (percent) | Tear strength (lbs.) |
|---|---|---|---|---|---|---|---|
| Rolled laminate [2] | 1 | 32 | 1.30 | 16,200 | 17,900 | 0.9 | 0.223 |
|  | 2 | 34 | 1.25 | 16,200 | 18,300 | 1.0 | 0.181 |
|  | 3 | 39 | 1.15 | 16,000 | 17,100 | 0.8 | 0.165 |
|  | 4 | 39 | 1.15 | 17,000 | 17,900 | 0.7 | 0.169 |
|  | 5 | 50 | 0.95 |  | 15,000 | 0.4 | 0.096 |
| 0.7 mil aluminum foil | $C_1$ |  | 0.70 | 5,400 | 8,300 | 2.1 | 0.042 |
| 0.9 mil aluminum foil | $C_2$ |  | 0.90 | 5,800 | 10,600 | 4.7 | 0.065 |

[1] Offset=0.2 percent.
[2] The laminates had a thickness of about 1.9 mils prior to rolling and were prepared from a layer of a copolymer of ethylene and acrylic acid about 1 mil thick and two outer layers of aluminum foil each about 0.35 mil thick.

The laminates of Examples 6 and 7 were prepared and rolled in accordance with the following procedure:

A sheet of aluminum foil 6" x 12" x 0.00035" was coated on one side to provide a layer of a selected polymer. The polymer was cast on the foil from a hot solution, said solution containing 10 percent by weight of solids of the polymer in xylene. The hot solution was applied to one face of the foil to obtain the desired thickness of polymer. The thin foil was placed on a glass backing plate and both the foil and glass plate preheated to a temperature of about 71° C. to about 82° C. to facilitate casting of the polymer solution. The heat from the glass plate was sufficient to effect curing of the polymer layer.

A second sheet of aluminum foil, having same dimensions as the first, was placed over the cast polymer layer. The assembly was placed in a heated platen press and subjected to a temperature of about 130° C. and pressure of about 450 p.s.i. for about 2 minutes. The temperature was reduced to about 85° C. before the laminate was removed from the press.

A strip 1-inch wide was cut from the laminated article as prepared above, said strip having a length of about 12 inches. The strip was rolled at room temperature between 8-inch rolls of a roll mill at a speed of about 90 feet per minute. The rolls were set such that the surface of one roll contacted the surface of the other. The percent reduction in thickness was calculated by subtracting the original length of the unrolled strip from the final length of the rolled strip and dividing the difference by the final length. The tensile strength, tensile elongation and tear strength were determined by the same methods as employed for the laminates of Examples 1 through 5.

Example 6

A thin laminate article was prepared in accordance with the procedure as described above wherein the metal was aluminum and the polymer was a copolymer of ethylene and 8 percent by weight acrylic acid. The laminate thickness before rolling was about 1.2 mils. The laminate was rolled in accordance with the above-described procedure and was reduced in thickness by about 37 percent which corresponds to a thickness of about .75 mil. The rolled laminate was tested and had the following properties:

| | |
|---|---|
| Yield strength | (1) |
| Ultimate strength, p.s.i. | 13,600 |
| Extension at fracture, percent | 0.28 |
| Tear strength, lbs. | 0.05 |

[1] No measurable yield strength.

Example 7

The procedure of Example 6 was substantially repeated except that the polymer was a terpolymer of ethylene, 8 percent by weight ethyl acrylate and 8 percent by weight acrylic acid. The laminate thickness before rolling was about 1.1 mils. The laminate was rolled and reduced in thickness by about 37 percent which corresponds to a thickness of about 0.69 mil. The rolled laminate was tested and had the following properties:

| | |
|---|---|
| Yield strength | (1) |
| Ultimate strength, p.s.i. | 17,000 |
| Extension of fracture, percent | 0.30 |
| Tear strength, lbs. | 0.03 |

[1] No measurable yield strength.

In place of the particular polymers and metal employed in the examples, other polymers and metals as hereinbefore described may also be employed to produce the invention and obtain substantially the same results.

The following laminates were prepared in accordance with the procedure as described under "Preparation of Laminates."

| | | | |
|---|---|---|---|
| Aluminum thickness (mils) (1 layer) | 0.7 | 0.35 | 0.47 |
| Plastic thickness (mils) | 2.0 | 2.00 | 1.50 |
| Total thickness (mils) (2 layers of aluminum) | 3.4 | 2.70 | 2.44 |

The above laminates were rolled and tested in accordance with the procedures as previously described. The results are substantially the same as those obtained for the laminates of the preceding examples.

What is claimed is:

1. A method for producing thin metal laminates comprising assembling a composite of at least two thin metal layers and a layer of a polymer disposed between said metal layers, said polymer having as essential components a major proportion of ethylene and a minor proportion of at least one ethylenically unsaturated carboxylic acid, said metal layers being selected from the group consisting of aluminum and alloys thereof having a tensile yield strength of between about 6000 and about 16,000 p.s.i., copper and alloys thereof having a tensile yield strength of between about 12,000 and about 40,000 p.s.i., and tin and alloys thereof having a tensile yield strength of between about 1500 and about 5000 p.s.i.,
producing a laminate of said composite by subjecting said composite to heat and pressure to form a bond between said metal layers and said layer of polymer; and rolling said laminate at a temperature of not more than about 75° C. to reduce the thickness of said laminate at least about 5 percent.

2. A method according to claim 1 wherein said rolling of said laminate is conducted at substantially normal room temperature.

3. A method according to claim 1 wherein the thickness of said laminate is reduced between about 10 and about 50 percent.

4. A method according to claim 1 wherein said rolling of said laminate is conducted at a speed of between about 50 and about 600 feet per minute.

5. A method according to claim 1 wherein said polymer is a random copolymer containing between about 75 and 99.5 weight percent combined ethylene and said ethylenically unsaturated carboxylic acid is selected from the group consisting of acrylic acid, methacrylic acid, crotonic acid, fumaric acid, and maleic acid, said ethylenically unsaturated carboxylic acid being present in said random copolymer in an amount between about 0.5 and about 25 weight percent.

6. A method according to claim 1 wherein said polymer is a random copolymer of ethylene and acrylic acid containing between about 0.5 and about 25 weight percent combined acrylic acid.

7. A method according to claim 1 wherein each of said metal layers of said composite have a thickness between about 0.2 and about 2 mils and said layer of polymer of said composite has a thickness between about 0.5 and about 4 mils.

8. A laminate prepared by the method of claim 1, having a thickness of less than about 3 mils and comprising at least two metal layers and a polymer interlayer disposed between said meal layers, said polymer having as essential components a major proportion of ethylene and a minor proportion of at least one ethylenically unsaturated carboxylic acid.

9. A continuous method for producing thin metal laminates comprising passing at least two thin metal layers through the nip of a first pair of oppositely rotating rolls, said metal layers being selected from the group consisting of aluminum and alloys thereof having a tensile yield strength of between about 6000 and about 16,000 p.s.i., copper and alloys thereof having a tensile yield strength of between about 12,000 and about 40,000 p.s.i., and tin and alloys thereof having a tensile yield strength of between about 1500 and about 5000 p.s.i., extruding a layer of a polymer between at least two of said thin metal layers, said polymer having as essential components a major proportion of ethylene and a minor proportion of at least one ethylenically unsaturated carboxylic acid; applying pressure to said thin metal layers and said layer of polymer by means of said rolls to form a laminate comprising at least two of said thin metal layers and said layer of polymer; and passing said laminate through the nip of a second pair of oppositely rotating rolls to roll said laminate at a temperature of not more than about 75° C. and thereby reduce the thickness of said laminate at least about 5 percent.

References Cited

UNITED STATES PATENTS

| | | | |
|---|---|---|---|
| 2,982,457 | 5/1961 | D'Alelio | 229—3.5 MF |
| 3,147,546 | 9/1964 | Bowman et al. | 117—75 X |
| 3,248,359 | 4/1966 | Maloney | 260—41 |
| 3,249,570 | 5/1966 | Potts et al. | 260—24.6 |
| 3,264,272 | 8/1966 | Rees | 260—78 S |
| 3,354,015 | 11/1967 | Klusmire et al. | 161—406 X |
| 3,382,136 | 5/1968 | Bugel et al. | 161—165 |
| 3,397,045 | 8/1968 | Winter | 29—191 |
| 3,454,445 | 7/1969 | Durst et al. | 161—219 X |
| 3,481,812 | 12/1969 | Holub et al. | 156—306 |

FOREIGN PATENTS

| | | | |
|---|---|---|---|
| 951,266 | 3/1964 | Great Britain | 161—216 |

OTHER REFERENCES

Baumeister et al.: Mechanical Engineers Handbook, McGraw-Hill, New York (1958), pp. 6–74, 6–77, 6–80, 6–87, 6–100 and 6–101 relied on.

WILLARD E. HOAG, Primary Examiner

U.S. Cl. X.R.

29—195 P; 156—309, 312, 334; 161—247; 229—3.5 MF